(12) United States Patent
Champ

(10) Patent No.: US 10,635,305 B2
(45) Date of Patent: Apr. 28, 2020

(54) TOUCHSCREEN USER INTERFACE WITH MULTI-LANGUAGE SUPPORT

(71) Applicant: Microchip Technology Incorporated, Chandler, AZ (US)

(72) Inventor: Garry J. Champ, Blue Ridge, TX (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 145 days.

(21) Appl. No.: 15/976,474

(22) Filed: May 10, 2018

(65) Prior Publication Data

US 2019/0235751 A1 Aug. 1, 2019

Related U.S. Application Data

(60) Provisional application No. 62/625,294, filed on Feb. 1, 2018.

(51) Int. Cl.
*G06F 3/0488* (2013.01)
*G06F 3/0484* (2013.01)
(Continued)

(52) U.S. Cl.
CPC .......... *G06F 3/04886* (2013.01); *G06F 3/018* (2013.01); *G06F 3/0236* (2013.01);
(Continued)

(58) Field of Classification Search
CPC ............. G06F 3/04886; G06F 16/3344; G06F 3/04847; G06F 17/2223; G06F 17/289;
(Continued)

(56) References Cited

U.S. PATENT DOCUMENTS 5,594,642 A * 1/1997 Collins ............... G06F 17/2223
715/236
5,790,115 A * 8/1998 Pleyer ................. G06F 3/0236
348/E5.099

(Continued)

FOREIGN PATENT DOCUMENTS

WO 01/33324 A2 5/2001 ............. G06F 17/21

OTHER PUBLICATIONS

International Search Report and Written Opinion, Application No. PCT/IB2019/000130, 12 pages, dated May 28, 2019.

*Primary Examiner* — Ryan Barrett
(74) *Attorney, Agent, or Firm* — Slayden Grubert Beard PLLC

(57) ABSTRACT

A touchscreen-based system for data entry using a language conversion is provided. The system may access a mapping database including mappings between character strings in a first language (e.g., English alphabet characters) and character objects in a second language (e.g., Chinese logograph characters). A touchscreen may display a user interface including (a) virtual input scroll wheels that display first language characters and which can be virtually scrolled by touch input to select a string of first language characters, and (b) a virtual results scroll wheel that displays second language character objects mapped to the user-selected string of first language characters, and allows the user to select (by scrolling) a particular second language character object. The selected second language character object may then be entered, e.g., by a touch-based command, into a displayed string of second language characters or into memory or to a related data processing system for further processing.

9 Claims, 6 Drawing Sheets

(51) Int. Cl.
*G06F 3/0482* (2013.01)
*G06F 3/023* (2006.01)
*G06F 3/01* (2006.01)

(52) U.S. Cl.
CPC .......... *G06F 3/0237* (2013.01); *G06F 3/0482* (2013.01); *G06F 3/04847* (2013.01)

(58) Field of Classification Search
CPC ...... G06F 3/018; G06F 3/0236; G06F 3/0237; G06F 3/0482
See application file for complete search history.

(56) References Cited

U.S. PATENT DOCUMENTS

| | | | | |
|---|---|---|---|---|
| 6,848,080 B1* | 1/2005 | Lee | ...................... | G06F 17/2223 704/9 |
| 7,403,888 B1* | 7/2008 | Wang | ...................... | G06F 3/018 704/2 |
| 7,809,550 B1* | 10/2010 | Barrows | ............. | G06F 17/2223 704/257 |
| 8,543,375 B2* | 9/2013 | Hong | .................. | G06F 17/2223 704/4 |
| 8,660,834 B2* | 2/2014 | Wu | ...................... | G06F 17/2223 704/1 |
| 9,116,548 B2* | 8/2015 | Hong | .................. | G06F 3/018 |
| 9,292,082 B1* | 3/2016 | Patel | .................. | G02B 27/017 |
| RE46,139 E * | 9/2016 | Kida | .................. | G06F 3/0237 |
| 9,471,566 B1* | 10/2016 | Zhang | ................ | G06F 17/2863 |
| 2004/0066405 A1* | 4/2004 | Wessler | ............... | G06F 1/1626 715/764 |
| 2004/0233238 A1* | 11/2004 | Lahdesmaki | ......... | G06F 3/0482 715/810 |
| 2005/0195159 A1* | 9/2005 | Hunleth | ............... | G06F 3/0236 345/156 |
| 2005/0210410 A1* | 9/2005 | Ohwa | .................. | G06F 3/0482 715/821 |
| 2006/0061556 A1* | 3/2006 | Yamane | .................. | G06F 3/018 345/173 |
| 2007/0296704 A1* | 12/2007 | Park | ...................... | G06F 3/0362 345/169 |
| 2008/0086704 A1* | 4/2008 | Aravamudan | ........ | G06F 3/0236 715/854 |
| 2008/0165149 A1* | 7/2008 | Platzer | .................. | G04G 11/00 345/173 |
| 2008/0215841 A1* | 9/2008 | Bolotin | ................ | G06F 3/018 711/164 |
| 2009/0055729 A1* | 2/2009 | Audet | ..................... | G06F 16/93 715/243 |
| 2009/0176532 A1* | 7/2009 | Chae | ..................... | G06F 3/0236 455/566 |
| 2010/0077355 A1* | 3/2010 | Belinsky | ............... | G06F 3/0482 715/835 |
| 2010/0271765 A1* | 10/2010 | Tang | ....................... | E05B 37/02 361/679.01 |
| 2011/0069012 A1* | 3/2011 | Martensson | ........ | G06F 3/04847 345/173 |
| 2012/0062465 A1* | 3/2012 | Spetalnick | ............ | G06F 3/0236 345/168 |
| 2013/0111346 A1* | 5/2013 | Little | .................... | G06F 3/0482 715/716 |
| 2013/0151234 A1* | 6/2013 | Huang | .................... | G06F 3/018 704/8 |
| 2014/0351760 A1* | 11/2014 | Skory | .................. | G06F 40/274 715/830 |
| 2014/0361997 A1* | 12/2014 | Wen | ..................... | G06F 3/04883 345/173 |
| 2015/0058802 A1* | 2/2015 | Turaj | ..................... | H04L 41/22 715/810 |
| 2015/0135121 A1* | 5/2015 | Peh | ....................... | G06F 3/0488 715/773 |
| 2015/0317077 A1* | 11/2015 | Tun | .................... | G06F 3/04886 715/773 |

* cited by examiner

TOUCHSCREEN USER INTERFACE WITH MULTI-LANGUAGE SUPPORT

CROSS-REFERENCE TO RELATED APPLICATIONS

This application claims priority to U.S. Provisional Patent Application No. 62/625,294 filed Feb. 1, 2018, the entire contents of which are hereby incorporated by reference for all purposes.

TECHNICAL FIELD

The present disclosure relates to data entry, and more particularly, to user interface systems and methods for data entry with a multi-language conversion.

BACKGROUND

Many languages use picture grams for the alphabet. It is generally not practical to implement a keyboard for these languages. Thus, systems have been developed for typing or data entry in such languages in which a user searches a database to retrieve each specific picture gram to be typed/entered. As an example, Chinese has multiple picture gram alphabets, including Mandarin and Cantonese. Typing or data entry systems have been developed that allow a user to enter a string of a few characters from a code-based alphabet (e.g., English alphabet). When the user enters a short character string in the code-based alphabet, (e.g., "mal"), the system presents one or multiple Chinese picture gram options that are mapped (in a database accessible to the system) to the short character string, the user may then select one of the picture gram options to insert into the relevant data field or document.

Thus, most computer users in China type out their Chinese in transliteration, using the standard English alphabet keys on a physical or virtual QWERTY keyboard. To generate a Chinese character (picture gram), the user types out its sound according to a spelling system called "Pinyin." The computer automatically converts the Pinyin spelling to the correct Chinese characters on the screen, or presents multiple Chinese character options to the user, and the user selects the desired character.

FIGS. 1A and 1B show an example user interface 10 for a traditional keyboard-based method of entering Chinese characters via the Pinyin system. The user types a string of one or more English characters into an input string field 12 using an English language keyboard, and the Pinyin system displays a numbered list 14 of different Chinese characters mapped to the currently active English character string entered by the user. The user may then select a desired Chinese character from the numbered list 14 by typing the corresponding number (0-9), and the selected Chinese character is then displayed in a results field 16. The user may then enter another English language character string and select a desired Chinese character corresponding to that English language character string.

In the example shown in FIG. 1A, the user has already selected two Chinese characters as shown in the results field 16 (by entering English language character strings and selecting Chinese characters mapped to those character strings), and the user has then entered the two-character string "no" in the input string field 12 (e.g., using an English language keyboard), which brings up numerous different Chinese character objects (individual Chinese logograms or Chinese logogram combinations/strings) mapped to the string "no." The user may then select from the different Chinese character objects by typing a corresponding number 0-9, or by typing "+" to bring up additional Chinese characters, to thereby add the selected Chinese character object to the Chinese character string displayed in the results field 16.

In the example shown in FIG. 1B, rather than selecting one of the Chinese character objects mapped to the string "no", the user expands the input string to "nor", which brings up a set of six Chinese character objects mapped to the string "nor," from which the user may select (by typing a corresponding number 0-6), to thereby add the selected Chinese character object to the Chinese character string displayed in the results field 16.

However, the types of language conversion data entry systems discussed above have various limitations. For example, such systems are not effective in many embedded systems implemented with only a touchscreen, particularly systems with a small touchscreen display, as a virtual keyboard consumes a large amount of screen area, and the virtual keys may be too small for accurate selection by a user's finger.

SUMMARY

A touchscreen-based system for data entry using a language conversion is provided. The system may access a mapping database including mappings between character strings in a first language (e.g., English alphabet characters) and character objects in a second language (e.g., Chinese logograph characters). A touchscreen may display a user interface including (a) virtual input scroll wheels that display first language characters and which can be virtually scrolled by touch input to select a string of first language characters (e.g., a string of English alphabet characters), and (b) a virtual results scroll wheel that displays one or more second language character objects (e.g., Chinese logograph characters) mapped to the user-selected string of first language characters (e.g., English character string). The virtual results scroll wheel may allow the user to select (by scrolling) a particular second language character object, e.g., based on the relevant context of the data being entered by the user. The selected second language character object may then be entered, e.g., by a touch-based command, into a string of second language characters displayed on the touchscreen, and/or stored in memory, and/or communicated to a related data processing system for further processing, for example.

BRIEF DESCRIPTION OF THE DRAWINGS

Example aspects of the present disclosure are described below in conjunction with the figures, in which.

DETAILED DESCRIPTION

Figure 1A:
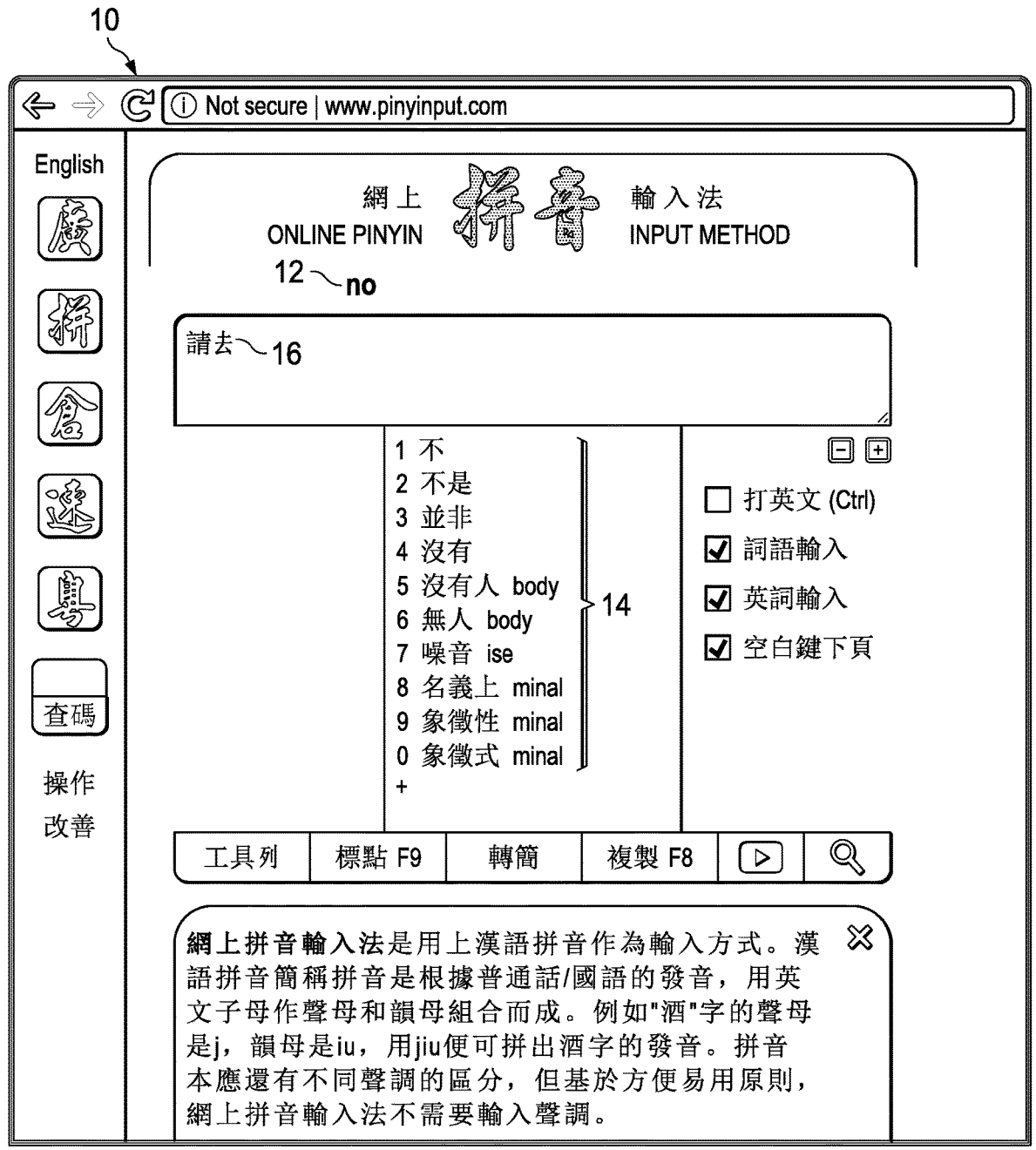
FIGS. 1A and 1B show an example user interface for a traditional keyboard-based method of entering Chinese characters via the Pinyin system.
Figure 1B:
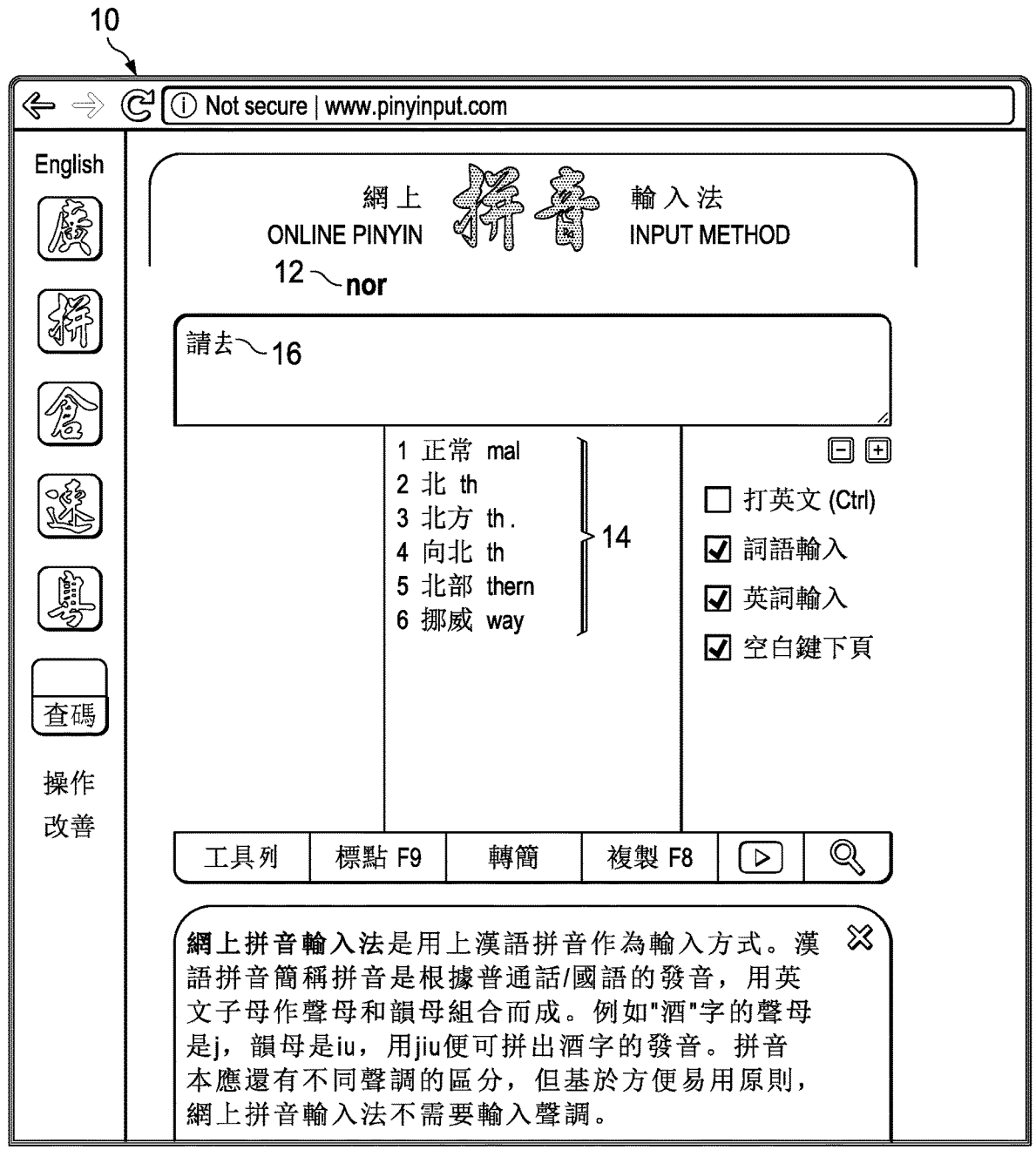

Embodiments of the invention provide systems and methods for data entry with language conversion using virtual scroll wheels on a graphical display, e.g., a touchscreen or other display.

Some embodiments are configured to display a user interface via a touchscreen. The displayed user interface may include (a) multiple virtual input scroll wheels each virtual input scroll wheel being scrollable via user touch input to scroll through a plurality of first linguistic characters (e.g., English characters) to select a particular first linguistic character (e.g., a particular English character), and (b) an output component configured to display at least one second linguistic character (e.g., at least one Chinese character). The output component of the displayed interface may be embodied as a further scroll wheel or any other graphical element. The displayed user interface may receive user touch input (on the touchscreen surface) at one or more of the virtual input scroll wheels to scroll through the first linguistic characters and select a particular first linguistic character at each respective virtual input scroll wheel. The displayed user interface may access a mapping database storing mappings between first linguistic characters and second linguistic characters to identify at least one second linguistic character (Chinese character) mapped to the particular first linguistic characters (English characters) selected at the virtual input scroll wheel(s), and display the identified second linguistic character(s) (Chinese character(s)) via the output component.

As used herein, a "linguistic character" is a character used in any writing system or script associated with any communication language, e.g., English (Latin alphabet), Chinese, Japanese, Korean, Arabic, Greek, Cyrillic, etc. "Characters" may include any alphabet characters, syllabary characters, logograms, or other symbols or glyphs included in or associated with any writing system or script. Some example linguistic characters include Latin alphabet characters (e.g., English alphabet characters), Greek alphabet characters, Arabic symbols or glyphs, and Asian language logograms, including CJK or CJKV characters such as Chinese Hanzi characters, Korean Hanja characters, Japanese Kanji characters. Chinese characters include at least Old/Classical Chinese characters and Mandarin Chinese characters.

As used herein, a "character string" or "string of characters" means a sequence (string) of one or more linguistic characters. For example, some embodiments involve a user selection of an English language character string consisting of a sequence of one, two, or three English alphabet characters.

Further, a "character object" includes one or more linguistic characters. For example, a Chinese language character object may include a single Chinese logogram, or a combination of multiple Chinese logograms that collectively represent a word, syllable, word prefix, or other portion of a word, for instance. In the pinyin system, each English language character strings is mapped to a set of Chinese character objects, which set may include one or more individual Chinese logograms and/or one or more Chinese logogram combinations.

The database may store mappings between character strings and/or linguistic characters of different languages. For example, the database may store (a) mappings between character strings of different languages, (b) mappings between character strings and linguistic characters of different languages, and/or (c) mappings between linguistic characters of different languages. In some embodiments, the database stores mappings between character strings of English alphabet characters (e.g., strings of one, two, or three English characters) and Chinese logograms.

In some embodiments, as discussed below, the database may map character strings to linguistic characters, where each character string of a first language is mapped to multiple alternative linguistic characters and/or character strings of a second language. For example, each character string of English alphabet characters (e.g., strings of one, two, or three English alphabet characters) may be mapped to multiple different Chinese character objects (logograms and/or logogram combinations/strings). In an example embodiment using such mappings, when a user inputs or selects a particular English language character string via touch-based scrolling of the virtual input scroll wheels, the displayed user interface may identify the multiple Chinese character objects mapped to the particular English language character string, display the multiple Chinese character objects to the user via a selectable component, e.g., a virtual results scroll wheel, and allow the user to select a particular Chinese character object, e.g., based on the context of the relevant data entry as understood by the user.

Thus, in some embodiments, a user interface (a) allows a user to manipulate virtual input scroll wheel(s) to select a string of English characters, (b) identifies multiple alternative Chinese character objects mapped to the selected English character string, (c) displays the multiple alternative Chinese character objects on a virtual results scroll wheel, (d) allows the user to manipulate the virtual results scroll wheel and select a particular one of the alternative Chinese character objects, and (e) allows the user to enter (or automatically enters) the selected Chinese character object into a defined data field or storage location, e.g., into a displayed field of selected-and-entered Chinese characters.

Figure 2A:
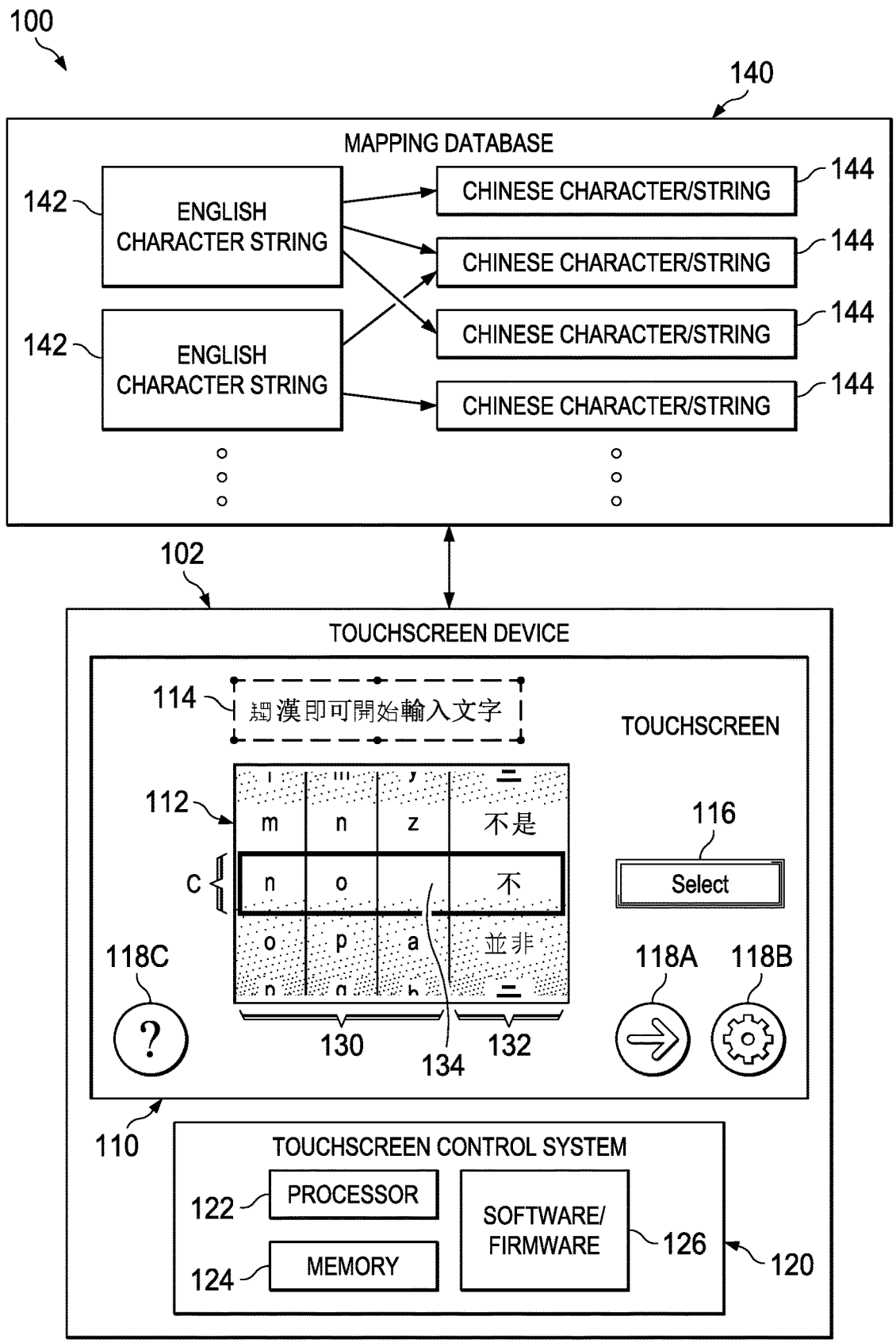
FIGS. 2A-2B illustrate an example user interface system for data entry using a language conversion, according to an example embodiment.
Figure 2B:
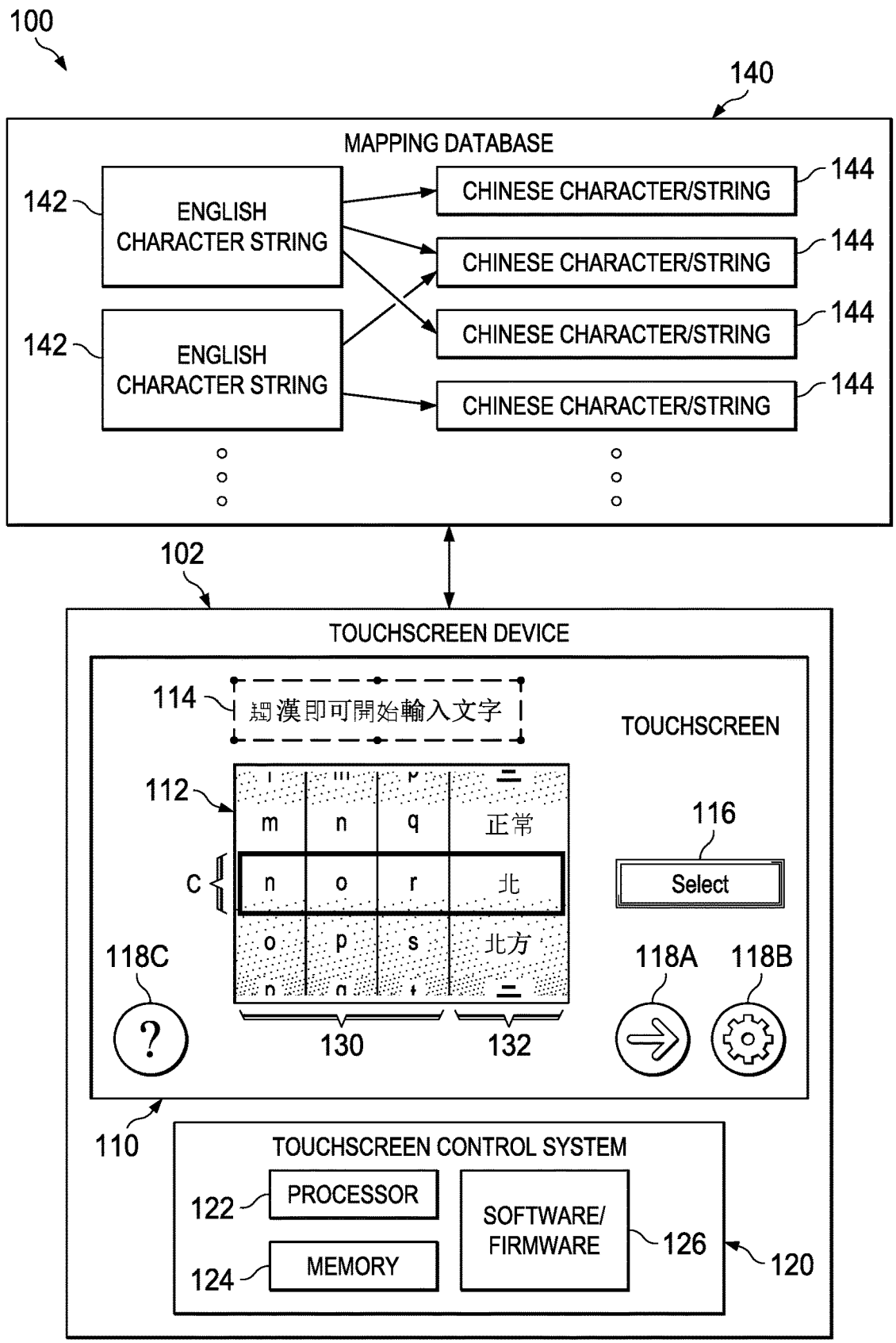

FIGS. 2A-2B illustrate an example user interface system 100 according to an example embodiment. User interface system 100 may include a touchscreen device 102 having a touchscreen display 110 and a touchscreen control system 120 communicatively coupled to a mapping database 140. Touchscreen device 102 may include any computer or other device including a touchscreen. FIGS. 2A and 2B show example views of touchscreen display 110 resulting from a user entry of two different input strings ("no" and "nor"), as explained below.

Touchscreen control system 120 may be configured to control the operation of touchscreen device 102, including processing touch-based user input via touchscreen 110 and controlling the information displayed via touchscreen 110 based on such user input. Touchscreen control system 120 may include at least one processor 122, memory device 124, and computer instructions 126, e.g., embodied as software and/or firmware, executable by the at least one processor 122 to control touchscreen 110 by providing at least the various functionality disclosed herein. Touchscreen control system 120 may be communicatively coupled to mapping database 140 using any suitable wired or wireless communication links.

Mapping database 140 may store mappings between English language character strings 142 and Chinese characters (logograms) 144, e.g., according to Pinyin or other character mapping system or dataset. In some embodiments, each English language character string 142 may be mapped to multiple different Chinese character objects (individual logograms and/or logogram combinations/strings) 144 according to a Pinyin-based mapping system. Mapping database 140 may be provided in or separate from touchscreen device 102 (e.g., locally or remotely).

Touchscreen display 110 may include a character selection region 112, a results field 114, an entry select button 116, and one or more additional function buttons 118. Each of the results field 114, entry select button 116, and additional function buttons 118 may be included or excluded, depending on the particular embodiments, e.g., depending on the size of the touchscreen 110. In the illustrated example, additional function buttons 118 include a navigation button 118A, a settings button 118B, and a help button 118C. In some embodiments, each display component may be moved and/or resized as desired, to thereby create a customized display, e.g., as indicated with the results field 114 shown in FIGS. 2A-2B.

In the example shown in FIGS. 2A-2B, the character selection region 112 may include three virtual input scroll wheels 130, each displaying multiple English characters (e.g., the entire English alphabet and/or other characters), and a virtual results scroll wheel 132 displaying one or multiple alternative Chinese character objects mapped (per mapping database 140) to the string of English characters currently selected via the virtual input scroll wheels 130. Each virtual scroll wheel 130 and 132 may be scrolled by a user's finger, according to any known virtual scrolling techniques. The character located in the center row "C" is the currently selected character for each virtual scroll wheel 130 and 132. In addition, each virtual scroll wheel 130 and/or 132 may rollover through the end/beginning of the set of characters displayed on the respective scroll wheel, or may stop at the first and last characters in the character set, e.g., depending on the particular embodiment and/or according to a user setting selected via settings options accessed via the settings button 118B.

To select and enter a desired Chinese character object, a user may manipulate one or more of the virtual input scroll wheels 130 to select a string of English characters (by positioning the selected English characters in the center row "C") known by the user to be mapped to the desired Chinese character object. In some embodiments, each virtual input scroll wheel 130 (or each virtual input scroll wheel 130 except for the first/leftmost scroll wheel) may include a blank character, thus enabling the user to select a one- or two-character long string of English characters by utilizing the blank(s), for example where the user knows that a particular one- or two-character long string of English characters is mapped to the desired Chinese character object. For example, FIG. 2A shows a blank character 134 in the third input scroll wheel 130, which may be utilized to input a two-character string via the first two virtual input scroll wheels 130. In the example shown in FIG. 2A, blank character 134 is selected at the third virtual input scroll wheel 130 to thereby define the two-character input string "no." In contrast, in the example shown in FIG. 2B, the third virtual input scroll wheel 130 is scrolled to select the latter "r", to thereby define the three-character input string "nor."

When the user selects the desired string of English characters (e.g., "no" in the example shown in FIG. 2A, or "nor" in the example shown in FIG. 2B), the system 100 may identify, from mapping database 140, a set of Chinese character objects mapped to the English character input string (including the desired Chinese character object), and display the set of Chinese character objects on the virtual results scroll wheel 132. If multiple alternative Chinese character objects are displayed on the virtual results scroll wheel 132, the user may manipulate scroll wheel 132 to select the desired Chinese character object by positioning the desired Chinese character object in the center row "C").

Once the desired Chinese character object is selected via the virtual results scroll wheel 132, the selection may then be confirmed, which may enter the Chinese character object into the (optional) results field 114, and/or into memory, and/or into a field of a document or file, etc. The selected Chinese character object may be confirmed and entered in any suitable way. For example, the selected Chinese character object may be confirmed and entered by tapping an (optional) entry select button 116, or by tapping, double tapping, or side-swiping the selected Chinese character object, or may be automatically confirmed/entered by the system after a defined duration (e.g., 2 seconds) with no detected touch input. In some embodiments, the manner for confirming and entering selected Chinese character objects may be user-defined, e.g., via settings options accessed via the settings button 118B.

After each Chinese character object is confirmed and entered, the virtual input scroll wheels 130 may maintain their current character selections or may reset to defined positions, e.g., depending on the particular embodiment and/or according to a user setting selected via settings options accessed via the settings button 118B. For example, each virtual input scroll wheel 130 may reset to "a", or to a blank character (e.g., blank 134 shown in FIG. 2A), or to a position at the middle of the alphabet (e.g., "m"), or to any other to another specified character(s).

Figure 3:
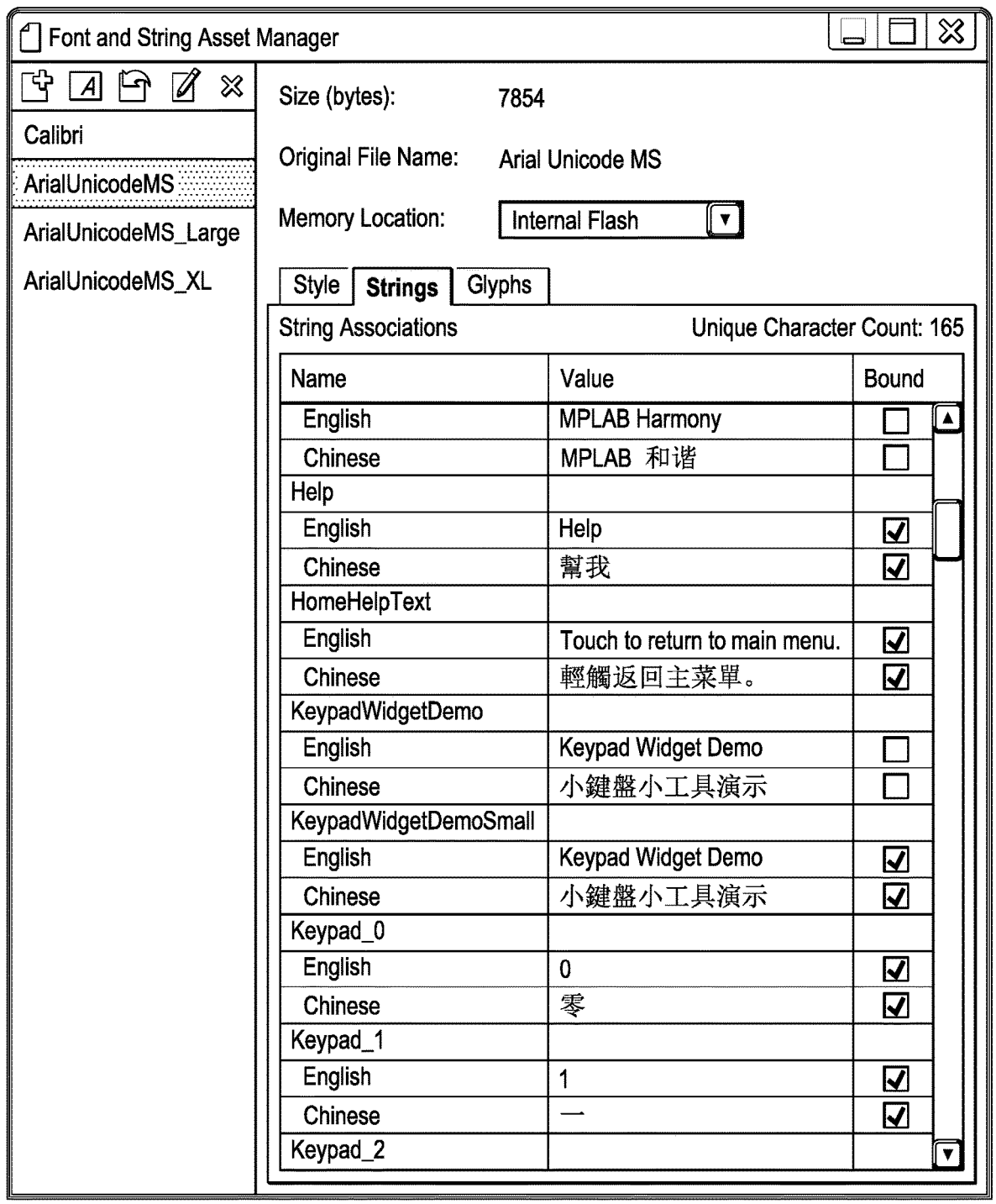
FIG. 3 illustrates an example font and string asset manager for providing a customizable interface for entering and managing multi-language character mappings, e.g., for populating a mapping database used by a user interface according to embodiments of the present invention.

FIG. 3 illustrates an example font and string asset manager 200, which provides a customizable interface for entering and managing multi-language character mappings, e.g., for populating a mapping database used by a user interface according to embodiments of the present invention. The font and string asset manager may allow a user to generating mappings between characters or characters strings of different languages or scripts selected by the user. These mappings may be stored in a mapping database as discussed herein, e.g., mapping database 140 shown in FIGS. 2A-2B.

Figure 4:
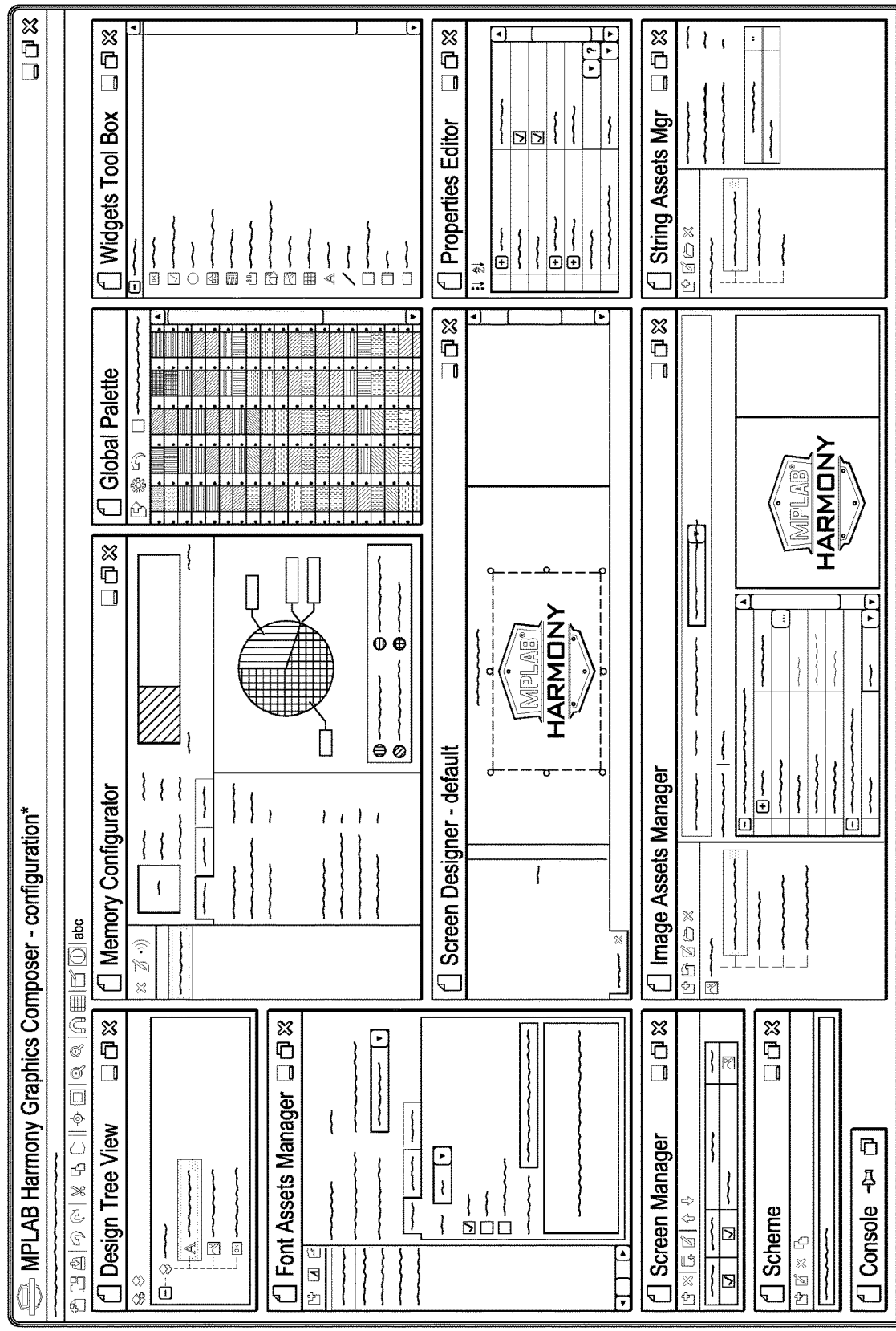
FIG. 4 illustrates an example integrated development environment for generating a user interface display including virtual scroll wheels (e.g., as shown in FIG. 2), according to one example embodiment.

FIG. 4 illustrates an example integrated development environment 300 (e.g., used by a compiler at runtime) for generating a user interface display including virtual scroll wheels (e.g., as shown in FIG. 2), according to one example embodiment. The example integrated development environment may be a plug-in tool for a graphics tool suite.

Embodiments of the disclosed invention provide various advantages. First, the disclosed system allows a user to operate in their native language. In addition, some embodiments allow a user to create custom local language specific implementations, e.g. using a script/font and string asset manager as shown in FIG. 3. Thus, embodiments of the invention have application across multiple languages, e.g., including English, Chinese, and other languages. Some embodiments may also reduce training time for a touchscreen user interface for users that do not know a second language. Further, some embodiments allow for faster training of the user interface even for users that know the second language.

Some embodiments allow for large font size for improved visibility on a touchscreen, e.g., due to the elimination of a virtual keyboard or other selection interface that typically requires substantial real estate on the touchscreen. Further, some embodiments allow for easy scaling between different screen sizes. Further, some embodiments are low cost; for example, the touchscreen system may provide a graphical interface that avoids the need for additional keypad or other data entry hardware. This may allow an intuitive user interface to be built for both end users and for a local expert building or configuring the control interface.

The invention claimed is:

1. A user interface system for language-based data selection and entry, the user interface system comprising:
a mapping database including mappings between (a) first language character strings including at least two first language characters and (b) second language character objects including at least one second language character, wherein each first language character comprises a linguistic character of a first language or script, and each second language character comprises a linguistic character of a second language or script; and
a processor configured to:
display a user interface via a touchscreen, the displayed user interface including:
at least two virtual input scroll wheels displaying a plurality of first language characters, each virtual input scroll wheel configured to selectively display multiple different first language characters and being scrollable via user touch input; and
a virtual results scroll wheel configured to automatically and selectively display at least one second language character and being scrollable via user touch input;
receive user touch input for virtually scrolling each of the virtual input scroll wheels to select a first language character on each respective virtual input scroll wheel by positioning the selected first language character on each respective virtual input scroll wheel in a predefined character selection location for each respective virtual input scroll wheel;
wherein the user-selected first language characters, displayed in the respective predefined character selection locations after virtual scrolling based on the user touch input, collectively define a particular first language character string;
access the mapping database to identify at least one second language character object mapped to the particular first language character string;
automatically display, via the virtual results scroll wheel, multiple second language character objects mapped to the particular first language character string; and
receive user touch input for virtually scrolling the virtual results scroll wheel to select one of the multiple displayed second language character objects by positioning the selected second language character object in a predefined result selection location for the virtual results scroll wheel.

2. The user interface system of claim 1, wherein the first language characters comprises English language characters, and the second linguistic characters comprises Chinese language characters.

3. The user interface system of claim 2, wherein the mapping database comprises a pinyin database.

4. The user interface system of claim 1, wherein at least some second language character objects include multiple second language characters.

5. The user interface system of claim 1, wherein:
the displayed user interface further includes:
a confirmation interface for user-confirmation of the selected second language character object positioned in the predefined result selection location after virtual scrolling based on the user touch input at the virtual results scroll wheel; and
a results display component configured to display a string of second language character objects selected by the user via user touch input at the virtual input scroll wheels and the virtual results scroll wheel and confirmed via the confirmation interface; and
the processor is configured to:
receive, via the confirmation interface, a user input confirming the at least one second language character object; and
in response, display the confirmed at least one second language character object via the results display component of the displayed user interface.

6. The user interface system of claim 1, wherein:
the displayed user interface further includes a results display component configured to display a string of confirmed second language character objects; and
the processor is configured to identify a confirmation event for confirming the at least one second language character object identified from the mapping database and displayed via the virtual results scroll wheel; and
display the confirmed at least one second language character object via the results display component of the displayed user interface.

7. The user interface system of claim 1, wherein the predefined character selection location for each respective virtual input scroll wheel and the predefined result selection location for the virtual results scroll wheel are aligned in a linear row.

8. A user interface system for language-based data selection and entry, the user interface system comprising:
a touchscreen device including a touchscreen display;
a mapping database including mappings between (a) first language character strings including at least two first language characters and (b) second language character objects including at least one second language character, wherein each first language character comprises a linguistic character of a first language or script, and each second language character comprises a linguistic character of a second language or script; and
a processor configured to:
display, via the touchscreen display, a user interface including:
at least two virtual input scroll wheels displaying a plurality of first language characters, each virtual input scroll wheel configured to selectively display multiple different first language characters and being scrollable via user touch input; and
a virtual results scroll wheel configured to automatically and selectively display at least one second language character and being scrollable via user touch input;
receive user touch input for virtually scrolling each of the virtual input scroll wheels to select a first language character on each respective virtual input scroll wheel by positioning the selected first language character on each respective virtual input scroll wheel in a predefined character selection location for each respective virtual input scroll wheel;
wherein the user-selected first language characters, displayed in the respective predefined character selection locations after virtual scrolling based on the user touch input, collectively define a particular first language character string;
access the mapping database to identify at least one second language character object mapped to the particular first language character string;

automatically display, via the virtual results scroll wheel, multiple second language character objects mapped to the particular first language character string; and receive user touch input for virtually scrolling the virtual results scroll wheel to select one of the multiple displayed second language character objects by positioning the selected second language character object in a predefined result selection location for the virtual results scroll wheel.

9. Non-transitory computer-readable media storing computer instructions executable by a processor to:

access a mapping database including mappings between (a) first language character strings including at least two first language characters and (b) second language character objects including at least one second language character, wherein each first language character comprises a linguistic character of a first language or script, and each second language character comprises a linguistic character of a second language or script;

display a user interface via a touchscreen, the displayed user interface including:

multiple virtual input scroll wheels, each virtual input scroll wheel being scrollable via user touch input to scroll through a plurality of first language characters to select a particular first language character;

a virtual results scroll wheel (a) configured to automatically display a plurality of second language characters in response to user selections of first language characters via the multiple virtual input scroll wheels and (b) being scrollable via user touch input to scroll through the plurality of second language characters to select a particular second language character:

receive user touch input via at least two virtual input scroll wheels to select a particular first language character at each respective virtual input scroll wheel by positioning the selected first language character at each respective virtual input scroll wheel in a predefined character selection location for that respective virtual input scroll wheel;

identify, from the mapping database, multiple second language character objects mapped to the at least two particular first language characters selected by the user via the at least two virtual input scroll wheels;

automatically display the multiple second language character objects via the virtual results scroll wheel; and receive user touch input via the virtual results scroll wheel to select a particular one of the multiple second language character objects by positioning the selected second language character object in a predefined result selection location for the virtual results scroll wheel.

* * * * *